US008757599B2

(12) United States Patent
McGregor et al.

(10) Patent No.: US 8,757,599 B2
(45) Date of Patent: Jun. 24, 2014

(54) STRIPPING ABSORPTION MODULE

(75) Inventors: Ian R. McGregor, Mississauga (CA); Christopher H. Belchers, Oakville (CA)

(73) Assignee: Drystill Holdings Inc., Mississauga (CA)

( * ) Notice: Subject to any disclaimer, the term of this patent is extended or adjusted under 35 U.S.C. 154(b) by 418 days.

(21) Appl. No.: 13/276,558

(22) Filed: Oct. 19, 2011

(65) Prior Publication Data
US 2012/0267079 A1 Oct. 25, 2012

Related U.S. Application Data

(63) Continuation of application No. PCT/CA2010/000604, filed on Apr. 16, 2010.

(60) Provisional application No. 61/231,412, filed on Aug. 5, 2009, provisional application No. 61/313,156, filed on Mar. 12, 2010.

(30) Foreign Application Priority Data

Apr. 20, 2009 (CA) ....................................... 2663397

(51) Int. Cl.
B01D 3/04 (2006.01)
(52) U.S. Cl.
USPC ........... 261/141; 95/227; 95/288; 165/104.21
(58) Field of Classification Search
USPC ........ 261/141; 95/149, 277, 288; 165/104.12, 165/104.21
See application file for complete search history.

(56) References Cited

U.S. PATENT DOCUMENTS

| | | | |
|---|---|---|---|
| 1,461,640 A | 7/1923 | Wirth-Frey | |
| 4,209,364 A | 6/1980 | Rothschild | |
| 4,343,678 A | 8/1982 | Franzen | |
| 4,379,734 A | 4/1983 | Franzen | |
| 4,458,500 A * | 7/1984 | Grossman et al. | ........... 62/238.3 |
| 4,846,240 A | 7/1989 | Erickson | |
| 4,963,231 A | 10/1990 | Ryham | |
| 5,645,694 A | 7/1997 | Stewart et al. | |
| 5,755,933 A | 5/1998 | Ognisty et al. | |
| 5,772,850 A | 6/1998 | Morris | |
| 6,958,111 B2 | 10/2005 | Rust et al. | |

OTHER PUBLICATIONS

Bejan, A., and Kraus, A.D. Heat Transfer Handbook, Chapter 16, pp. 1181-1194, John Wiley & Sons, 2003.
Gao, et al., Isobaric phase equilibria of the system 1-butanol + water containing penicillin G potassium salt at low pressures, Elsevier, Fluid Phase Equilibria 214 (2003) pp. 137-149.

* cited by examiner

*Primary Examiner* — Robert A Hopkins
(74) *Attorney, Agent, or Firm* — Lipsitz & McAllister, LLC

(57) ABSTRACT

In a process, a portion of a liquid mixture flow is vaporized to produce a vapor and a depleted flow of liquid. The vapor is introduced to a brine which is adapted to exothermically absorb one or more components from the vapor, and heat is withdrawn, to produce at least a flow of heat and a flow of brine which is enriched in the one or more components. The heat previously withdrawn is transferred, to drive the vaporization. This heat transfer is associated with the change of a working fluid from a gaseous into a liquid state. The heat withdrawal involves the change of the working fluid from the liquid to the gaseous state. In the liquid state, the working fluid flows only by one or more of gravity, convection and wicking. In the gaseous state, the working fluid flows only by one or more of diffusion and convection.

25 Claims, 9 Drawing Sheets

STRIPPING ABSORPTION MODULE

This application is a continuation of international application number PCT/CA2010/000604 filed Apr. 16, 2010 and claims the benefit of Canadian Patent Application No. 2,663,397 filed Apr. 20, 2009, U.S. Provisional Patent Application No. 61/231,412 filed Aug. 5, 2009 and U.S. Provisional Patent Application No. 61/313,156 filed Mar. 12, 2010.

FIELD OF THE INVENTION

The present invention relates generally to the field of fluid separation.

BACKGROUND OF THE INVENTION

In the field of fluid separation, it is known to utilize a brine, such as a LiBr brine, for the absorption of a process vapor and the consequential generation of heat. It is also known to utilize a pump to drive a heat-carrying fluid around a heat exchange circuit to carry the heat generated by the absorber to an evaporator or boiler to produce the process vapor.

SUMMARY OF THE INVENTION

A process for use with a flow of a liquid mixture that is separable by vaporization into a flow of vapor and a depleted flow of liquid forms one aspect of the invention. The process comprises: a vaporization step, wherein a portion of said liquid mixture flow is vaporized to produce said flow of vapor and said depleted flow of liquid; an absorption step, wherein (i) the flow of vapor is introduced to a flow of brine which is adapted to exothermically absorb one or more components from the vapor and (ii) heat is withdrawn, to produce at least a flow of heat and a flow of brine which is enriched in the one or more components; and a heat transfer step, wherein the heat withdrawn in the absorption step is transferred, to drive the vaporization in the vaporization step. The transfer of heat to drive the vaporization is associated with the phase change of a working fluid from a gaseous state into a liquid state. The withdrawal of heat in the absorption step involves the phase change of the working fluid from the liquid state into the gaseous state. In the liquid state, the working fluid flows only by one or more of gravity, convection and wicking. In the gaseous state, the working fluid flows only by one or more of diffusion and convection. Apparatus forms another aspect of the invention. The apparatus is for use with a flow of a liquid mixture that is separable by vaporization into a flow of vapor and a depleted flow of liquid. The apparatus comprises a structure which, in use:

defines a first volume wherein said liquid mixture is received and separated into said flow of vapor and said depleted flow of liquid;

defines a first liquid passage by which said depleted flow leaves the first volume;

defines a vapor passage by which said flow of vapor leaves the first volume;

defines a second volume to which the vapor passage leads;

includes heat and mass transfer apparatus disposed at least in part in the second volume, the heat and mass transfer apparatus: (i) receiving a flow of brine adapted to exothermically absorb one or more components from the vapor; (ii) introducing the flow of brine to the vapor; and (iii) withdrawing heat from the second volume, to produce at least a flow of heat and a flow of brine which is enriched in the one or more components;

defines a second liquid passage by which the flow of brine which is enriched in the one or more components leaves the second volume; and includes heat movement apparatus for transferring the flow of heat to the first volume to provide for said separation.

In the apparatus, in use, the transfer of heat into the first volume is associated with the phase change of a working fluid from a gaseous state into a liquid state; the withdrawal of the heat from the second volume involves the phase change of the working fluid from the liquid state to the gaseous state; in the liquid state, the working fluid flows only by one or more of gravity, convection and wicking; and in the gaseous state, the working fluid flows only by one or more of diffusion and convection.

According to another aspect of the invention, the heat movement apparatus and part of the heat and mass transfer apparatus can be defined by one or more heat pipes, each of said one or more heat pipes having a heat receiving part disposed in the second volume and a heat delivering part disposed in the first volume to provide for said heat transfer.

According to another aspect of the invention, the one or more heat pipes can be stacked such that that portion of the heat pipes disposed in the first volume operate in use as a packed vaporization column and that portion of the heat pipes disposed in the second volume operate in use as a packed absorption column.

According to another aspect of the invention, in use, the vapor leaving the first volume can be in substantial vapor-liquid equilibrium with the liquid mixture entering the first volume.

According to another aspect of the invention, in use, the temperature of the depleted flow of liquid leaving the first volume can be lower than the temperature of the liquid mixture entering the first volume.

According to another aspect of the invention, in use, the pressure in the first volume and the temperature of the liquid mixture entering the first volume can be such that substantially all of the heat transferred to the first volume results in vaporization of the liquid mixture.

According to another aspect of the invention: the structure can further define a vent leading from the second volume; and in use, at least a substantial portion of the vapor can be absorbed in the second volume, the balance leaving the second volume via the vent.

According to another aspect of the invention, the apparatus can further comprise desorption apparatus for receiving the flow of brine produced by the heat and mass transfer apparatus and producing: the flow of brine adapted to exothermically absorb said one or more components from the vapor; and a product stream.

According to another aspect of the invention, the apparatus can further comprise: a secondary absorber which, in use: (i) receives the balance of the vapor; and (ii) introduces the balance of the vapor to a secondary flow of brine which is adapted to exothermically absorb the one or more components, to produce a diluted brine.

According to another aspect of the invention, the desorption apparatus can further receive the diluted brine and further produces the secondary flow of brine.

According to another aspect of the invention, in use: the pressures in the first volume and second volume can be reduced in comparison to atmospheric pressure; at least the majority of the vapor can be absorbed in the second volume; and a vacuum pump can provide for at least the non-condensables of the vapor to be voided from the apparatus.

According to another aspect of the invention, the first volume can be defined by one or more first voids and the second volume can be defined by one or more second voids.

According to another aspect of the invention, each of the one or more first voids and each of the one or more second voids can be defined by a respective vessel; and piping can define the vapor passage.

According to another aspect of the invention, each of the one or more first voids and each of the one or more second voids can be defined in a vessel.

According to another aspect of the invention, piping exterior to the vessel can define the vapor passage.

According to another aspect of the invention: the vessel can be compartmentalized by bulkheads to define the one or more first voids and one or more second voids and; one or more apertures defined in the bulkheads can define the vapor passage.

The apparatus can form part of a bioproduct production facility, which forms another aspect of the invention. The facility comprises, in addition to the apparatus, an arrangement wherein, in use, catabolism of a broth takes place on a continuous basis. The apparatus is coupled to the arrangement to: withdraw a flow of the broth on a continuous basis; remove a catabolic inhibitor from the withdrawn broth to produce an inhibitor-containing flow and a remainder flow; and return the remainder flow to the arrangement.

According to another aspect of the invention, the catabolism can be fermentation and the inhibitor can be alcohol.

According to another aspect of the invention, the inhibitor-containing flow can have a higher concentration of the inhibitor than does the broth.

According to another aspect of the invention, in use, a bleed stream of the broth can be withdrawn to avoid toxin buildup; the bleed stream can be fermented in batches; and the facility can further comprise further apparatus for receiving the product of a batch fermentation and producing (i) a stream of whole stillage from which ethanol has been substantially removed and (ii) brine enriched in ethanol which is fed to the desorption apparatus and separated.

According to another aspect of the invention, in use: the broth withdrawn from the arrangement can have a temperature of about 28-32° C. and an ethanol concentration of about 4-10%; the remainder flow can have a temperature of about 2-4° C. lower than that of the withdrawn flow, and have an ethanol concentration of about 2-6% less than that of the withdrawn flow; and the pressure in the first volume can be about 30-100 Torr.

According to another aspect of the invention, in use: the broth withdrawn from the arrangement can have a temperature of about 30° C. and an ethanol concentration of about 7%; the remainder flow can have a temperature of about 28° C. and an ethanol concentration of about 2%; and the pressure in the first volume can be about 30 Torr.

According to another aspect of the invention, the heat pipes can be arranged parallel to a common axis and the structure can be adapted for pivotal movement about a horizontal axis which is orientated normally to the common axis.

The apparatus of the invention can, according to yet another aspect of the invention, form part of a bio-product production facility which comprises an arrangement wherein, in use, catabolism of a broth takes place on a batch basis. In this facility, the apparatus is coupled to the arrangement to: withdraw a flow of the broth; remove a catabolic inhibitor from the withdrawn broth to produce an inhibitor-containing flow and a remainder flow; and return the remainder flow to the arrangement.

Other advantages, features and characteristics of the present invention will become more apparent upon consideration of the following detailed description and the appended drawings, the latter being briefly described hereinafter, it being understood in the drawings, like reference numerals denote like structures throughout.

DETAILED DESCRIPTION

Figure 1:
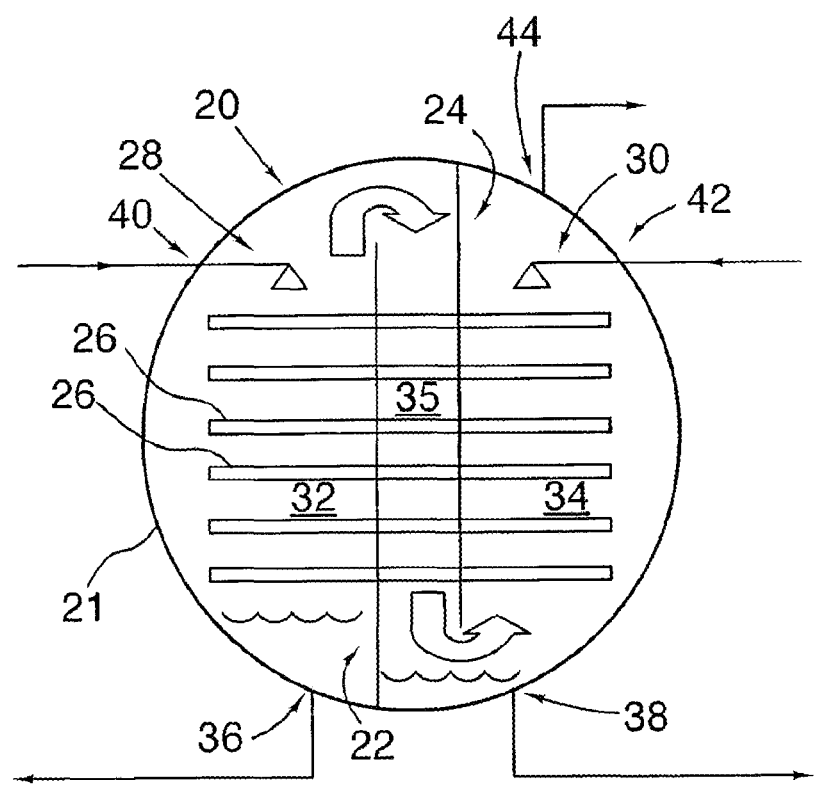
FIG. 1 is a schematic view of a stripping/absorption module according to an exemplary embodiment of the invention.

A stripping/absorption module (SAM) is shown in FIG. 1 in schematic form and designated with general reference numeral 20.

This module comprises: a vessel 21, a pair of bulkheads 22,24, a plurality of heat pipes 26 and a pair of distributors 28,30.

Vessel 21 is a robust vessel, suitable for operation at reduced pressures, for example, 30 Torr.

The pair of bulkheads comprises a first bulkhead 22 and a second bulkhead 24. The first bulkhead 22 extends upwardly from the base of the vessel and terminates beneath the top of the vessel. The second bulkhead 24 is disposed in spaced relation from the first, extends downwardly from the top of the vessel and terminates above the base. Through this arrangement, first 32 and second 34 voids are defined interiorly of the vessel, which are coupled to one another by a conduit 35 defined by the space between the bulkheads 22,24. The vessel is punctuated by a plurality of ports 36-44, one lower port 36,38 at the base of each void, one upper port 40,42 adjacent the top of each void and one uppermost port 44 proximal the top of the second void 34.

The plurality of heat pipes 26 extend from the first void 32 to the second void 34 and are for carrying heat from the second void 34 to the first void 32. The heat pipes 26 are of conventional construction and as such are not described herein in detail.

The pair of distributors 28,30 extend one each from the upper ports 40,42 of the first and second voids 32, 34 and are adapted for wetting the heat pipes 26.

From this, it should be understood that the major functional features of the illustrated SAM are:
first void 32;
second void 34;
the conduit 35 connecting the first and second voids;
the lower ports 36,38;
the upper ports 40,42;

the uppermost port 44;
the heat pipes 26; and
the distributors 28,30

Figure 2:
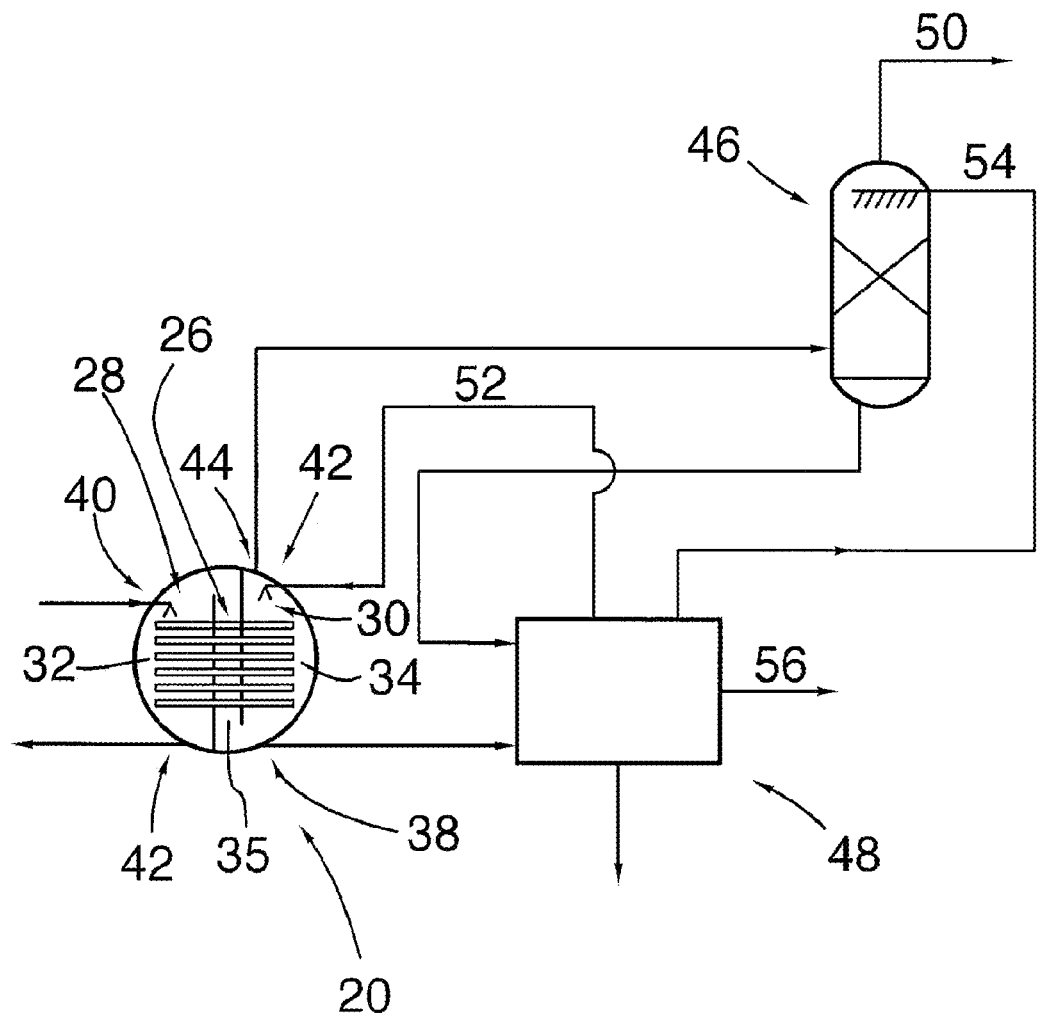
FIG. 2 is a schematic view of the module of FIG. 1 in an exemplary use.

FIG. 2, which is a schematic embodiment of an exemplary separator apparatus for use with a flow of a mixed liquid that is separable by vaporization into a flow of vapor and a depleted flow of liquid, shows the manner in which such major functional features operate in use.

Herein, it will be seen that the module 20 is shown along with a secondary absorber 46 and a desorption apparatus 48.

Turning first to the module 20, it will be understood that the first void 32 forms a first volume. This is where the flow of mixed liquid is received and partially vaporized into the aforementioned flows of vapor and depleted flow of liquid. The manner in which vaporization is carried out is described below, in the description relating to the heat pipes.

The lower port 42 at the base of the first volume defines a first liquid passage by which said depleted flow of liquid leaves the first volume 32.

The conduit 35 defines a vapor passage by which said flow of vapor leaves the first volume 32.

The second void 34 defines a second volume to which the vapor passage 35 leads.

The uppermost port 44 defines a vent.

The distributors 28,30 and heat pipes 26 together define heat and mass transfer apparatus and heat movement apparatus. The heat and mass transfer apparatus: (i) receives a flow of brine adapted to exothermically absorb one or more components from the vapor; (ii) introduces the flow of brine to the vapor (i.e. the brine is sprayed or dropped into the second volume 34 onto the heat pipes 26); and (iii) withdraws heat from the second volume, to produce at least a flow of heat and a flow of brine which is enriched in the one or more components. The heat movement apparatus transfers the flow of heat to the first volume 32 to provide for said separation, and as such, each of the heat pipes 26 has a heat receiving part disposed in the second volume and a heat delivering part disposed in the first volume.

The brine can be, for example, only, LiBr solution having a lithium bromide mass concentration between 40% to 70%, preferably between 45% to 65%. However, any absorbent fluid known in the art would be suitable.

The lower port 38 at the base of the second volume 34 defines a second liquid passage by which the flow of brine which is enriched in the one or more components leaves the second volume 34.

By virtue of use of the heat pipes, it will be understood that: that the transfer of heat into the first volume is associated with the phase change of a working fluid, in this case, water, from a gaseous state into a liquid state; the withdrawal of the heat from the second volume involves the vaporization of the working fluid from the liquid state into the gaseous state; the working fluid in the liquid state flows only by one or more of gravity and wicking; and the working fluid in this gaseous state flows only by one or more of diffusion and convection. Working fluids other than water can and would be used, depending upon the application: ammonia and commercial refrigerant fluids are but two examples. The choice of working fluid is a matter of routine to persons of ordinary skill and as such is not described herein.

The heat pipes 26 are stacked such that that portion of the heat pipes disposed in the first volume 32 operate in use as a packed evaporation column and that portion of the heat pipes disposed in the second volume 34 operate in use as a packed absorption column.

Accordingly:
the vapor leaving the first volume 32 is in substantial vapor-liquid equilibrium with the mixed liquid entering the first volume 32;
at least a substantial portion of the vapor is absorbed in the second volume 34, with the balance leaving the second volume via the vent 44.

The secondary absorber 46: (i) receives the balance of the vapor, i.e. that portion not absorbed in the SAM; and (ii) introduces the balance of the vapor to a secondary flow of brine which is adapted to exothermically absorb the one or more components. This produces a diluted brine and also produces a gas stream composed of non-absorbable gases and any non-absorbed absorbables, the latter being vacated from the secondary absorber along arrow 50.

The desorption apparatus 48, i.e. a boiler or a distillation apparatus, receives the flow of brine produced by the heat and mass transfer apparatus and the diluted brine produced by the secondary absorber 46 and produces:
the flow of brine 52 adapted to exothermically absorb at least one or more components from the vapor; and the secondary flow of brine 54; and
a product stream 56.

Figure 3:
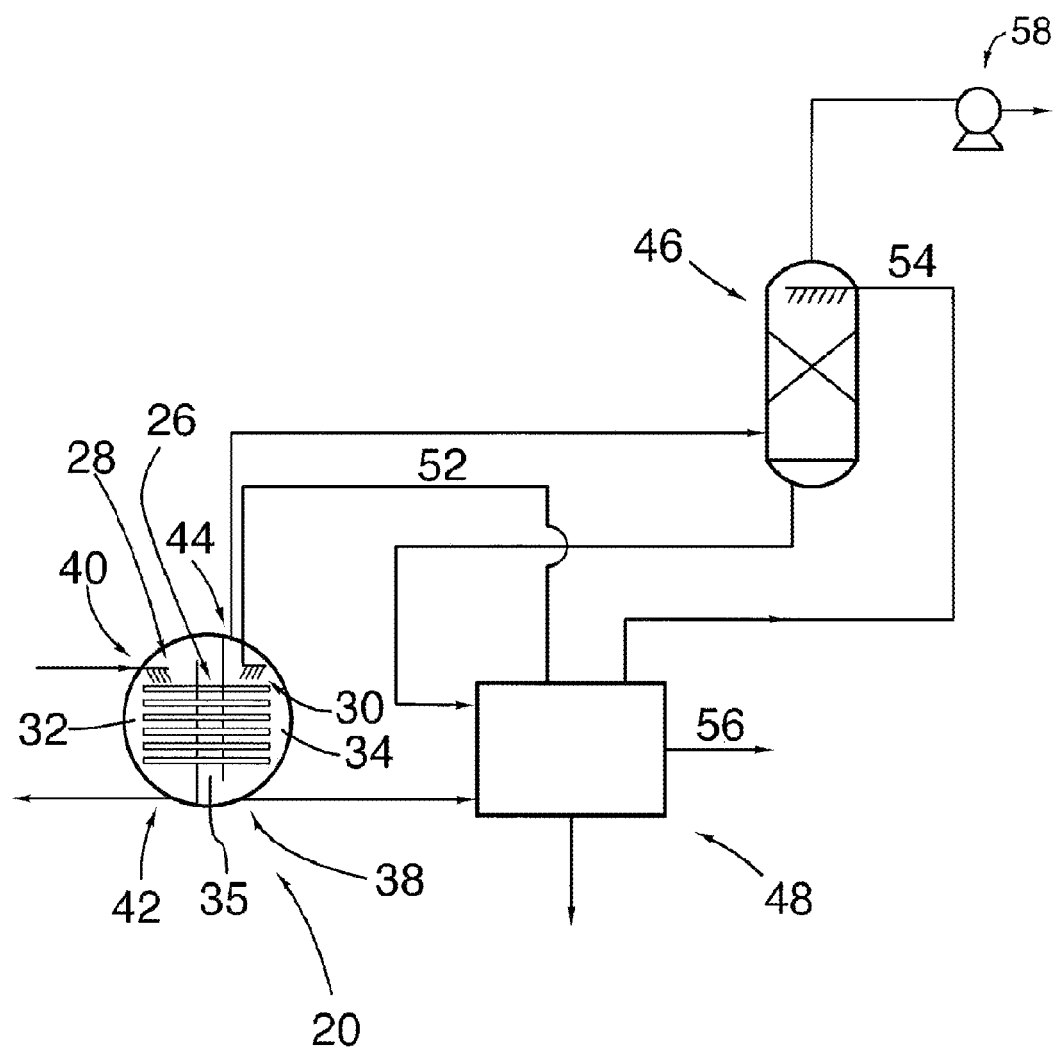
FIG. 3 is a view, similar to FIG. 2, of another exemplary use of the structure of FIG. 1.

FIG. 3 shows a variation of the structure of FIG. 2, for use in circumstances wherein the pressures in the first volume and second volume are reduced in comparison to atmospheric pressure. In this application, at least the majority of the enriched vapor is absorbed in the second volume and a vacuum pump 58 provides for the non-condensables and any unabsorbed condensables in the vapor to be voided from the apparatus.

Figure 4:
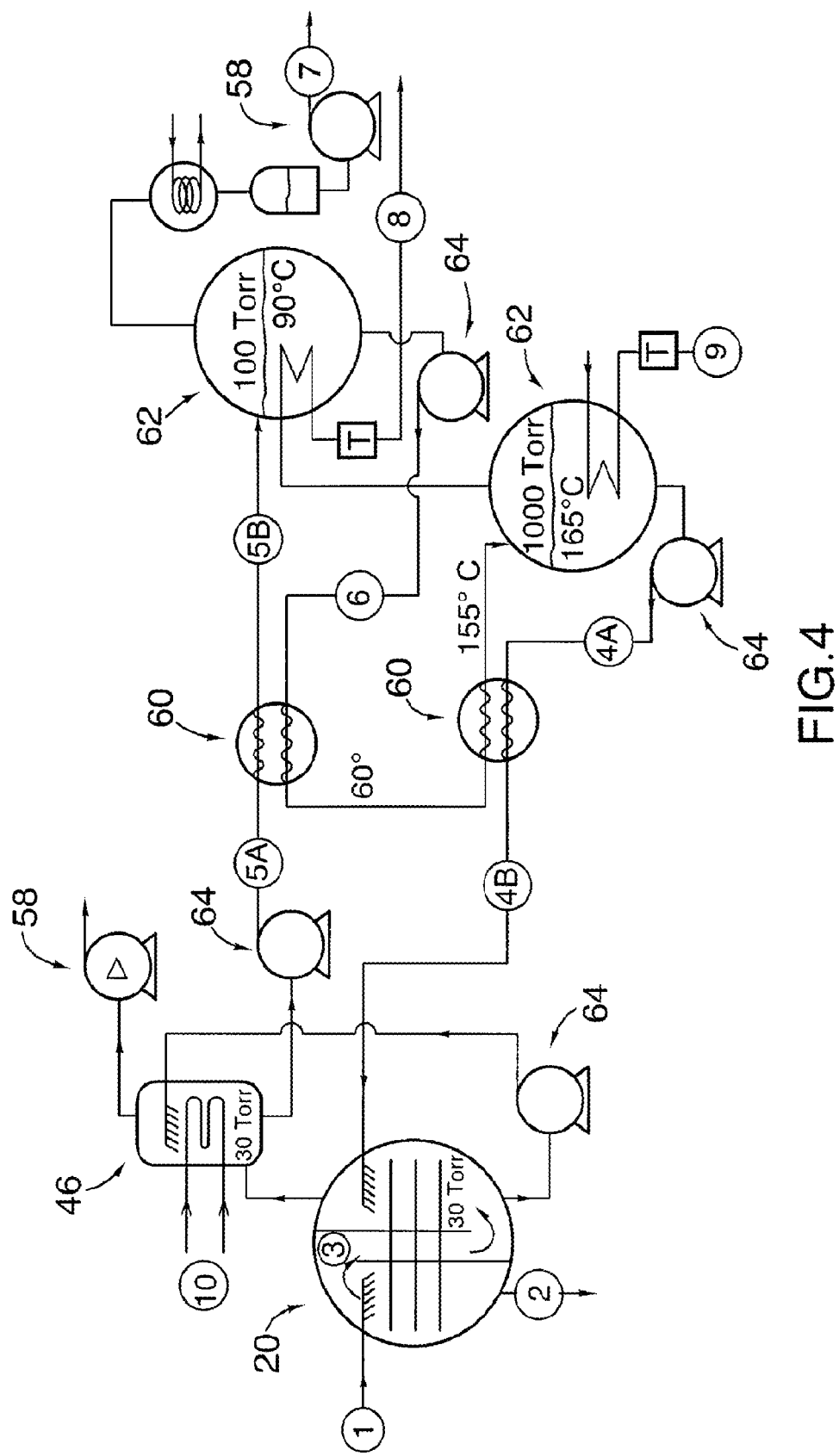
FIG. 4 is a another schematic view showing another exemplary use of the structure of FIG. 1.

Turning now to FIG. 4, same will be understood to show in schematic form a plant that could be usefully used for concentrating apple juice. This plant is generally similar to the structure of FIG. 3, i.e. in that it includes a SAM 20, a secondary absorber 46 and a vacuum pump 58, but the desorption apparatus 48 has, rather than a distillation device, a two-stage desorber [since the purpose in this application is not to fractionate the mixed liquid but merely to concentrate the juice.] The two-stage desorber includes a number of economizers 60, to advantageously pass heat between various parts of the process, a pair of boilers 62 and variety of pumps 64. Predictions have been made in respect of the operation of this system, the values being set forth on Table 1, below.

TABLE 1

| Stream | Flow rate lb/hr | | | Temp °C. | % LiBr |
| --- | --- | --- | --- | --- | --- |
| | Water | LiBr | Total | | |
| 1 | 100 | 0 | 100 | 30 | 0 |
| 2 | 60 | 0 | 60 | 30 | 0 |
| 3 | 40 | 0 | 40 | 30 | 0 |
| 4A | 80 | 120 | 200 | 165 | 60 |
| 4B | 80 | 120 | 200 | 70 | 60 |
| 5A | 40 | 120 | 240 | 55 | 50 |
| 5B | 40 | 120 | 240 | 85 | 50 |
| 6 | 98 | 120 | 218 | 90 | 54.2 |
| 7 | 18.7 | 0 | 18.7 | 30 | 0 |
| 8 | 21.3 | 0 | 21.3 | 105 | 0 |
| 9 | 25.6 | 0 | 25.6 | 178 | 0 |
| 10 | As required | | | <30 | |

The predicted energy input (in the form of 125 psig steam) fed via stream 12, is 557 Btu/lb water evaporated. This contrasts favorably to simple evaporation efficiency [about 1000 Btu/lb]. At the same time, the facility is predicted to be relatively inexpensive to construct and operate, as will be evidence to persons of ordinary skill in the art on review of the schematic.

Figure 5:
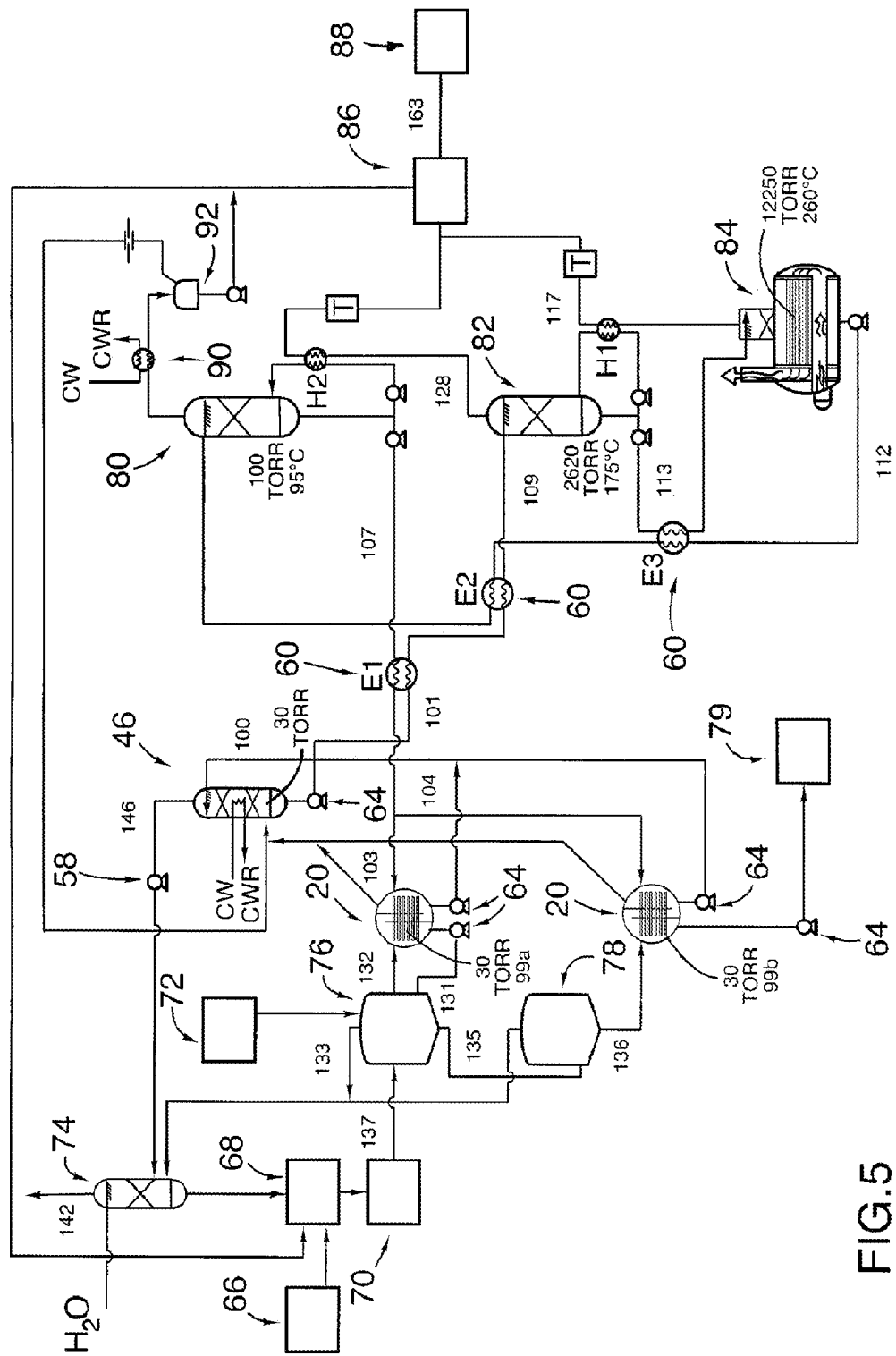
FIG. 5 is a schematic view of an ethanol production facility employing two modules according to FIG. 1.

Turning now to FIG. 5, same will be understood to show in schematic form an ethanol production facility and will be seen to include:

a corn milling facility 66, a cooking/liquefaction facility 68 and a saccharification facility 70; these are all substantially conventional, in that they take corn and create therefrom a feedstock suitable for fermentation;

a condenser 90 and receiver 92, for condensing the recycle water stream and returning same to the corn milling facility 68;

a rectifier/dehydration facility 86;

economizers 60 and pumps 64, for passing flows between the various elements; and ethanol product storage facility 88.

Predicted operating conditions for various of the flows are indicated in Table 2.

| FERMENTATION TRAIN | | Mass flow rate lb/hr | | | | | percent | percent | Temperature |
|---|---|---|---|---|---|---|---|---|---|
| Stream name | Stream # | water | sugars | DGS | ethanol | total | ethanol | sugars | Degrees C. |
| Mash fed to main fermentor | 137 | 224,400 | 66,000 | 37,620 | 0 | 328,020 | 0 | 20 | 30 |
| Beer feed to SAM1 | 132 | 211,455 | 5,610 | 37,620 | 18,117 | 272,802 | 7 | 2 | 30 |
| Beer recycled from SAM1 | 131 | 198,511 | 5,610 | 37,620 | 6,039 | 247,780 | 2 | 2 | 28 |
| Main fermentor bleed | 135 | 211,455 | 5,610 | 37,620 | 18,117 | 272,802 | 7 | 2 | 30 |
| Fully fermented beer | 136 | 211,455 | 0 | 37,620 | 20,922 | 269,997 | 8 | 0 | 32 |

| BRINE TRAIN | | Mass flow rate lb/hr | | | | Stream Composition | | | Temperature |
|---|---|---|---|---|---|---|---|---|---|
| Stream name | Stream # | LiBr | Water | Ethanol | Total | % LiBr | % Water | % Ethanol | Degrees C. |
| SAM1 vapours | 99a | 0 | 12,944.63 | 12,078.00 | 25,022.63 | 0 | 51.73 | 48.27 | 30 |
| SAM2 vapours | 99b | 0 | 19,927.34 | 20,922.00 | 40,849.34 | 0 | 48.78 | 51.22 | 30 |
| Feed to Secondary Absorber | 100 | 133,028 | 121,558 | 33,000 | 287,586 | 50 | 42 | 11.47 | 55 |
| Product from Secondary Absorber | 101 | 133,028 | 128,787 | 33,803 | 295,618 | 45 | 44 | 11.43 | 45 |
| Strong Brine to SAM1 | 103 | 66,514 | 44,343 | 0 | 110,857 | 60 | 40 | 0 | 70 |
| Strong Brine to SAM2 | 104 | 66,514 | 44,343 | 0 | 110,857 | 60 | 40 | 0 | 70 |
| Low Pressure Desorber Product | 107 | 133,028 | 88,686 | 0 | 221,714 | 60 | 40 | 0 | 95 |
| High Pressure Desorber Poduct | 112 | 133,028 | 105,799 | 3,426 | 242,254 | 55 | 44 | 1.41 | 260 |
| Mid Pressure Desorber Product | 113 | 133,028 | 118,271 | 15,898 | 267,197 | 50 | 44 | 6 | 175 |
| Ethanol Laden Condensate | 117 | 0 | 12,472 | 12,472 | 24,944 | 0 | 50 | 50 | 202 |
| Mid Pressure Vapor | 118 | 0 | 10,516 | 17,905 | 28,421 | 0 | 37 | 63 | 138 |
| Ethanol Product as vapor | 163 | 0 | 134 | 33,000 | 33,134 | 0 | 0 | 100 | ambient | a yeast conditioning facility 72, for producing a flow of water, enzymes and yeast;

a continuous stirred tank reactor (CSTR) 76: to which the feedstock, water, etc, are fed, in which fermentation continuously takes place and from which a bleed stream 135 is drawn;

a SAM device 20, coupled to the CSTR to: withdraw a flow of the fermentation broth on a continuous basis, preferentially remove alcohol from the withdrawn broth to produce an enriched alcohol (brine) flow 104 and a remainder flow 131; and return the remainder flow 131 to the CSTR 76;

a batch tank 78, which receives and ferments the bleed stream 135 in batches a second SAM device 20 coupled to receive the product from the batch tank 78 and produce (i) a stream of whole stillage from which ethanol has been substantially removed and (ii) brine enriched in ethanol a stillage processor 79 a secondary absorber 46, for absorbing the remainder of the absorbables not taken up by the SAM devices 20;

a vent scrubber 74 for extracting trace alcohol from, inter alia, the batch tank 78 and the secondary absorber 46 and diverting same back to the cooking facility 68, before exhausting non-condensables to atmosphere via stream 142

3 desorbers 84,82,80, arranged to create a three-stage desorber, to regenerate the brine, produce a concentrated ethanol stream; and produce a recycle water stream;

Persons of ordinary skill in the art will readily understand the operation of the device in consideration of these flows and the schematic. Accordingly, for brevity, a detailed item-by-item description is neither required nor provided.

However, Table 2 is notable at least for the following:

product streams fed to the rectifier 86 are of concentrations suitable for conventional processing by pervaporation or molecular sieve techniques;

calculations suggest that high quality heat requirements, i.e. fuel-generated heat, for the high pressure desorber 84, are 4,717 btu/gallon ethanol produced [up to the rectifier 86]; this contrasts favorably to common ethanol production facilities, wherein heat requirements up to rectification can reach as high as 18,000 btu/gallon the broth withdrawn from CSTR 76 has a temperature of about 30° C. and the remainder broth has a temperature of about 28° C.; this arrangement is advantageous, in that the broth is never elevated in temperature above about 30° C. [or supercooled], which would harm the live yeast.

Again, the facility is predicted to be relatively inexpensive to construct, as will be evident to persons of ordinary skill.

Without intending to be bound by theory, it is believed that the advantageous energy and construction cost requirements flow in part from:

the pressure in the first volume 32 and the temperature of the mixed liquid entering the first volume 32 are such that substantially all of the heat transferred to the first volume 32 results in evaporation of the mixed liquid;

the remainder broth has a temperature lower than that of the withdrawn broth, thereby reducing chilling loads on the CSTR;

the use of multiple-effect desorption; and the relatively modest refrigeration loads associated with the vaporization [which, in areas where very cold cooling water is not available in abundance, i.e., as is commonly the case, must be provided by mechanical means]

Figure 6:
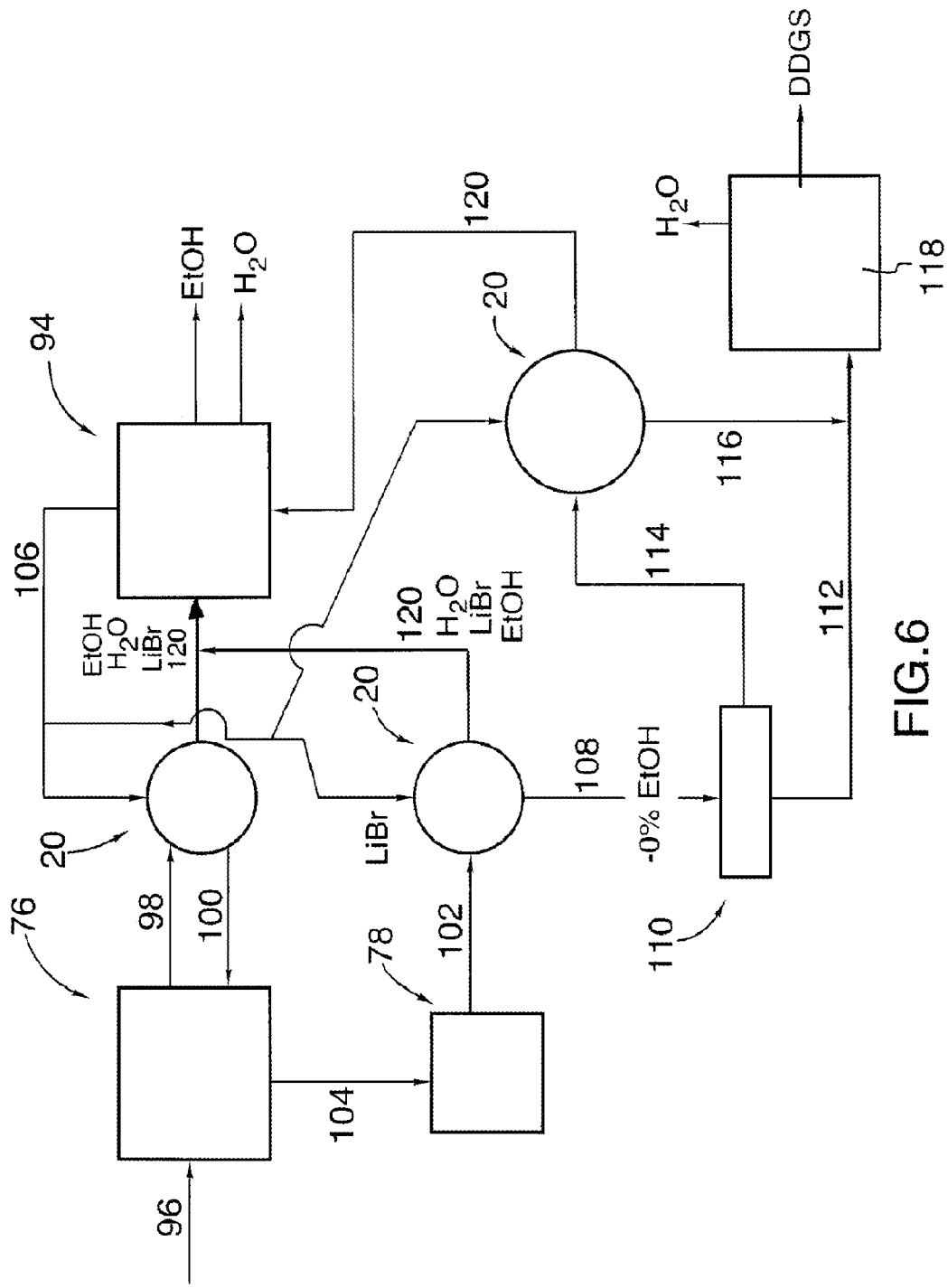
FIG. 6 is a simplified schematic view of the ethanol production facility of FIG. 5 in combination with a simplified view of the structure of FIG. 4.

FIG. 6 shows a simplified variation of the FIG. 5 structure, with further detail in respect of an advantageous method for stillage processing, utilizing a SAM according to the invention. Briefly, CSTR 76 receives feedstocks 96 and produces strong beer 98 which is fed to a SAM apparatus 20. Weak beer 100 passes back from this SAM to CSTR 76. A bleed stream 104 passes to batch tank 78. Strong beer 102 from batch tank 78 is fed to its own SAM 20. Whole stillage 108 from batch tank 78 is centrifuged 110 to produce wet cake 112 and thin stillage 114, the latter being sent to yet another SAM 20, to produce syrup 116 which, along with cake 112, is dried in a DDGS dryer 118. Dilute brine 120 produced by each of the SAMS is fed to still 94 for regeneration. Although still 94 shows all of the diluted brines converging, it should be understood that still apparatus 94 could have two trains, thereby to keep separate brine streams relatively higher concentration in ethanol and brine streams relatively barren of ethanol.

The predicted utility in respect of the aforementioned prophetic examples has been verified experimentally.

Experimental Results

Twenty heat pipes, each 7.0" in length and 0.25" in diameter, were mounted horizontally, one above the other, to form an array about 10.0" in height. This assembly was sandwiched between transparent sheets of acrylic. Two separate, side-by-side chambers [an evaporator chamber and an absorber chamber] were formed between the sheets, with the heat pipes passing through both chambers. A 0.5" ID hose was used to connect the top part of the evaporator chamber to the bottom of the absorber chamber. At the top of each chamber, a crude liquid distributor was provided. At the top of each chamber, a 2 liter flask, vented to atmosphere was provided, and coupled to the liquid distributor of that chamber via a flow control valve. At the bottom of each chamber, a liquid exit port was provided, coupled to a collection flask. A vent at the top of the absorber chamber was coupled a standard laboratory vacuum pump with two lines of defense protecting it from water and ethanol vapours.

The first defense measure was a secondary absorber comprised of a flask partly filled with a strong cool LiBr solution. Gases en route to the vacuum pump were forced to bubble through the solution in the flask, stripping them of absorbable components. The second stage of defense was a liquid nitrogen cold trap.

Two runs were made. In each run, measured amounts of brine were provided in the bubbler tank and absorber-coupled flask and a measured amount of beer was provided in the evaporator-coupled flask; the flow control valves were opened; and temperature and pressure measurements were made as the liquids traversed the unit. Readings were terminated when one or both of the feed flasks had been drained.

TABLE 3

Run 1

| Time Elapsed (min) | Beer Input °C. | Beer Output °C. | Brine Input °C. | Brine Output °C. | System Pressure mmHg |
|---|---|---|---|---|---|
| 1 | 26 | 24 | 49 | 23 | 41.7 |
| 2 | 27 | 27 | 60 | 42 | 37.2 |
| 3 | 27 | 27 | 62 | 48 | 33 |
| 4 | 27 | 27 | 63 | 52 | 29.1 |
| 5 | 27 | 27 | 64 | 52 | 27.7 |
| 6 | 27 | 28 | 64 | 55 | 27.7 |
| 7 | 27 | 29 | 65 | 53 | 28.6 |
| 8 | 27 | 31 | 66 | 56 | 28 |

| | | |
|---|---|---|
| Bubbler | starting weight | 1303 g |
| | ending weight | 1304 g |
| Cold trap | starting weight | 0 |
| | Ending weight | 0 |
| Beer | starting weight | 83 g ethanol + 952 g water = 1035 g (8% EtOH) |
| | ending weight | 70 g ethanol + 931 g water = 1000 g (7% EtOH) |
| Brine | starting weight | 701 g water + 1052 g LiBr = 1753 g (60% LiBr) |
| | Ending weight | 13 g ethanol + 713 g H$_2$0 + 1052 LiBr = 1778 (59% LiBr) |

This test confirmed that the SAM can preferentially remove ethanol from an ethanol-water mixture and simultaneously cool the ethanol water mixture. It also indicated that a secondary absorber is a useful way to remove residual water and ethanol vapors from the vacuum train. The heat transfer coefficient for the device in this run was calculated as 33 BTU/hr/ft$^2$/° F.

TABLE 4

Run 2

| Time Elapsed (min) | Beer Input °C. | Beer Output °C. | Brine Input °C. | Brine Output °C. | System Pressure mmHg |
|---|---|---|---|---|---|
| 1 | 35 | 22 | 50 | 37 | 20 |
| 2 | 36 | 25 | 63 | 44 | 25 |
| 3 | 36 | 27 | 68 | 49 | 25 |
| 4 | 36 | 27 | 69 | 52 | 30 |
| 5 | 36 | 27 | 71 | 53 | 30 |
| 6 | 37 | 30 | 72 | 55 | 30 |
| 7 | 37 | 30 | 72 | 55 | 40 |
| 8 | 36 | 30 | 72 | 54 | 42 |
| 9 | 37 | 31 | 72 | 53 | 40 |
| 10 | 37 | 31 | 72 | 53 | 40 |
| 11 | 37 | 31 | 73 | 53 | 40 |
| 12 | 36 | 31 | 73 | 52 | 40 |
| 13 | 36 | 32 | 73 | 53 | 40 |
| 14 | 36 | 33 | 76 | 58 | 40 |
| 15 | 36 | 33 | 77 | 60 | 45 |
| 16 | 35 | 34 | 78 | 61 | 43 |
| 17 | 34 | 34 | 78 | 63 | 43 |
| 18 | 34 | 34 | 79 | 64 | 45 |

| | | |
|---|---|---|
| Bubbler | starting weight | 1303 g |
| | ending weight | 1304 g |
| Cold trap | starting weight | 0 |
| | Ending weight | 16.5 g ethanol + 16.5 g water = 33 g (50% EtOH) |
| Beer | starting weight | 481 g ethanol + 1236 g water = 1717 (28% EtOH) |
| | ending weight | 307 g ethanol + 1154 g water = 1462 g (21% EtOH) |
| Brine | starting weight | 1239 g water + 1859 LiBr = 3098 g (60% LiBr) |
| | Ending weight | 115 g EtOH + 1293 g $H_2O$ + 1859 g LiBr = 3267 (43% LiBr) |

This test also confirmed that the SAM device can preferentially remove ethanol from an ethanol-water mixture and simultaneously cool the ethanol water mixture. The heat transfer coefficient for the device in this run was calculated as 70 BTU/hr/ft$^2$/° F. As the liquid distribution system in the test apparatus left unwetted much of the heat pipe surface area, this performance is viewed as relatively favourable. A more thorough liquid distribution can be expected to bring the coefficient in line with published values for commercial systems, which typically exceed 150 BTU/hr/ft$^2$/° F.

Whereas FIG. 1 shows a schematic SAM, it will be evident to persons of ordinary skill in the art that changes can be made.

Figure 7:
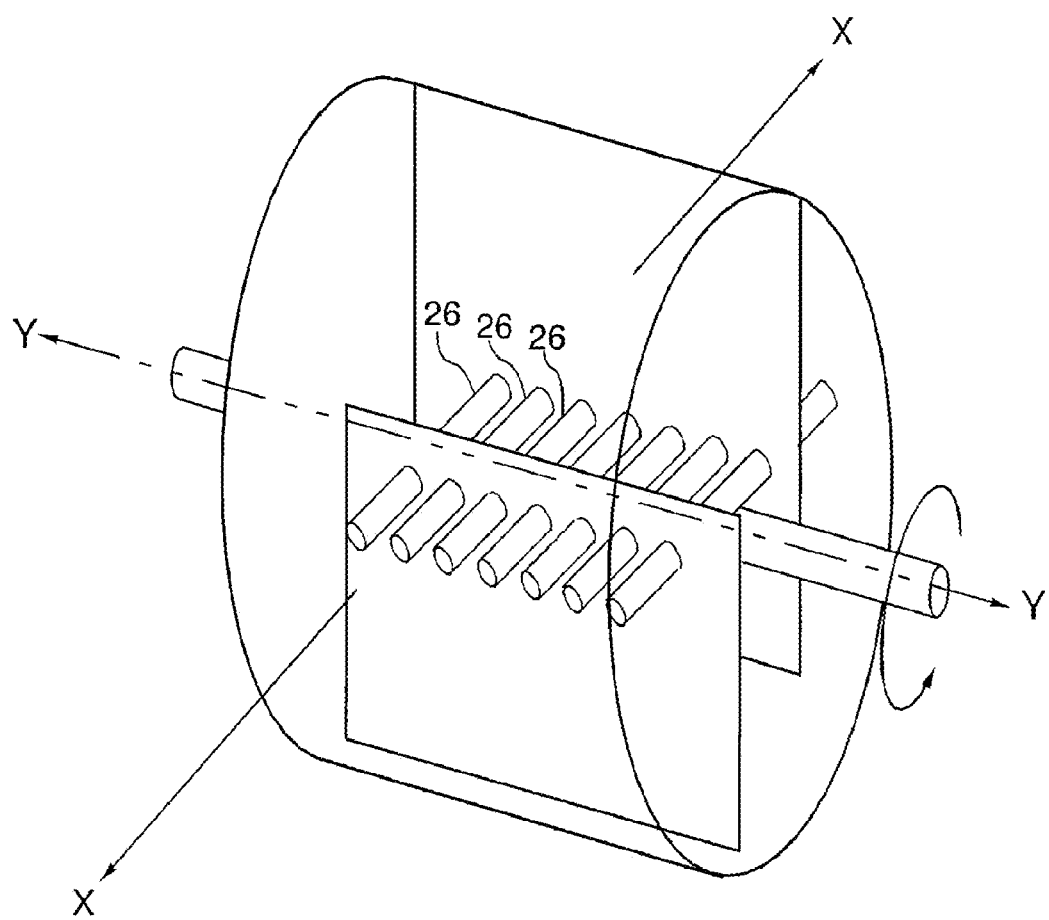
FIG. 7 is a schematic view of an alternate embodiment of the module of FIG. 1.

FIG. 7 shows one such possibility, namely, an arrangement wherein the heat pipes 26 are arranged parallel to a common axis X-X and the structure is adapted for pivotal movement about a horizontal axis Y-Y which is orientated normally to the common axis. It is contemplated that this arrangement could be used to periodically expedite clearance of liquid from the heat-delivering parts of the pipes.

Figure 8:
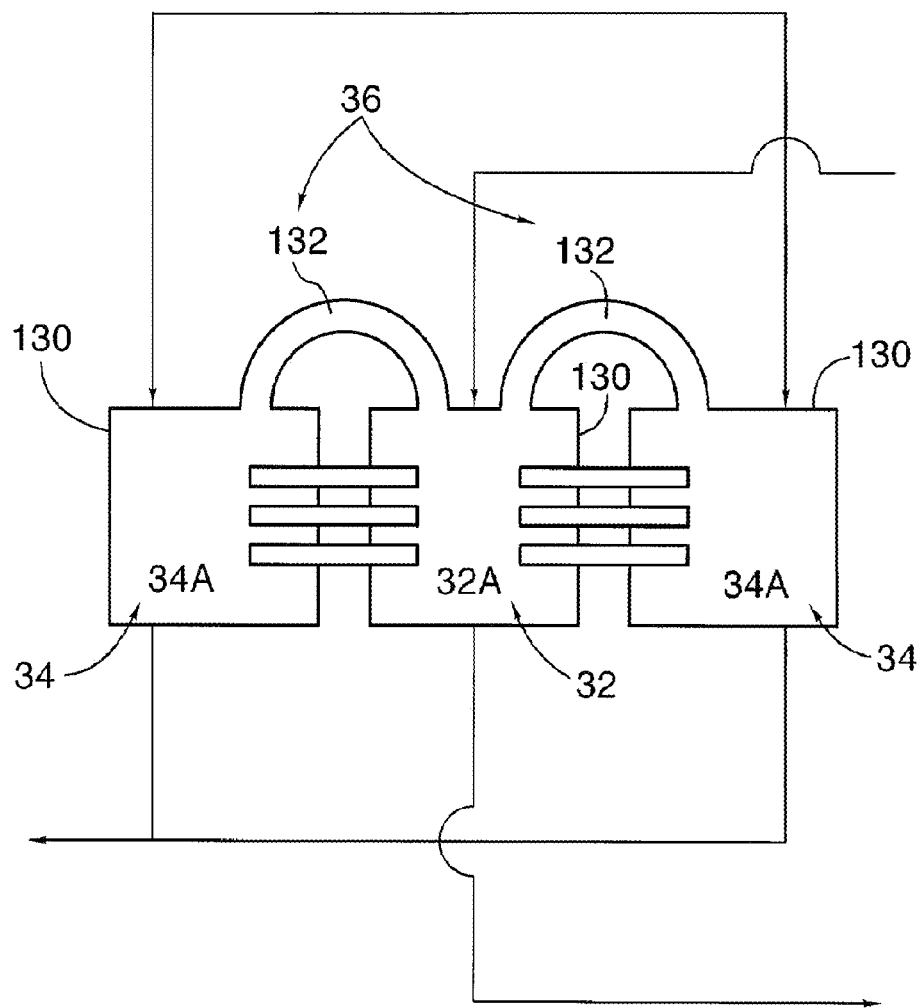
FIG. 8 is a schematic view of a yet further embodiment of the module of FIG. 1.

FIG. 8 shows another possibility, wherein the first volume 32 is defined by one or more first voids 32A, the second volume 34 is defined by one or more second voids 34A, each of the one or more first voids 32A and each of the one or more second voids 34A are defined by a respective vessel 130; and piping 132 defines the vapor passage 36. It is contemplated that this embodiment may have some usefulness in terms of reduced construction costs, as well as heat transfer efficiency [shorter heat pipes are normally better]. Discrete vessels render it possible to create substantial pressure differentials between the absorption and vaporization operations, and commensurate greater temperature differentials. A greater temperature differential would result in higher heat transfer through the heat pipes; this could have advantage in terms of capital costs, i.e. fewer heat pipes and smaller vessels.

However, it should be understood that small pressure differentials could be created even within a SAM device of the type shown schematically in FIG. 1, by the interposition, for example, of a pump or fan in the vapor passage.

Figure 9:
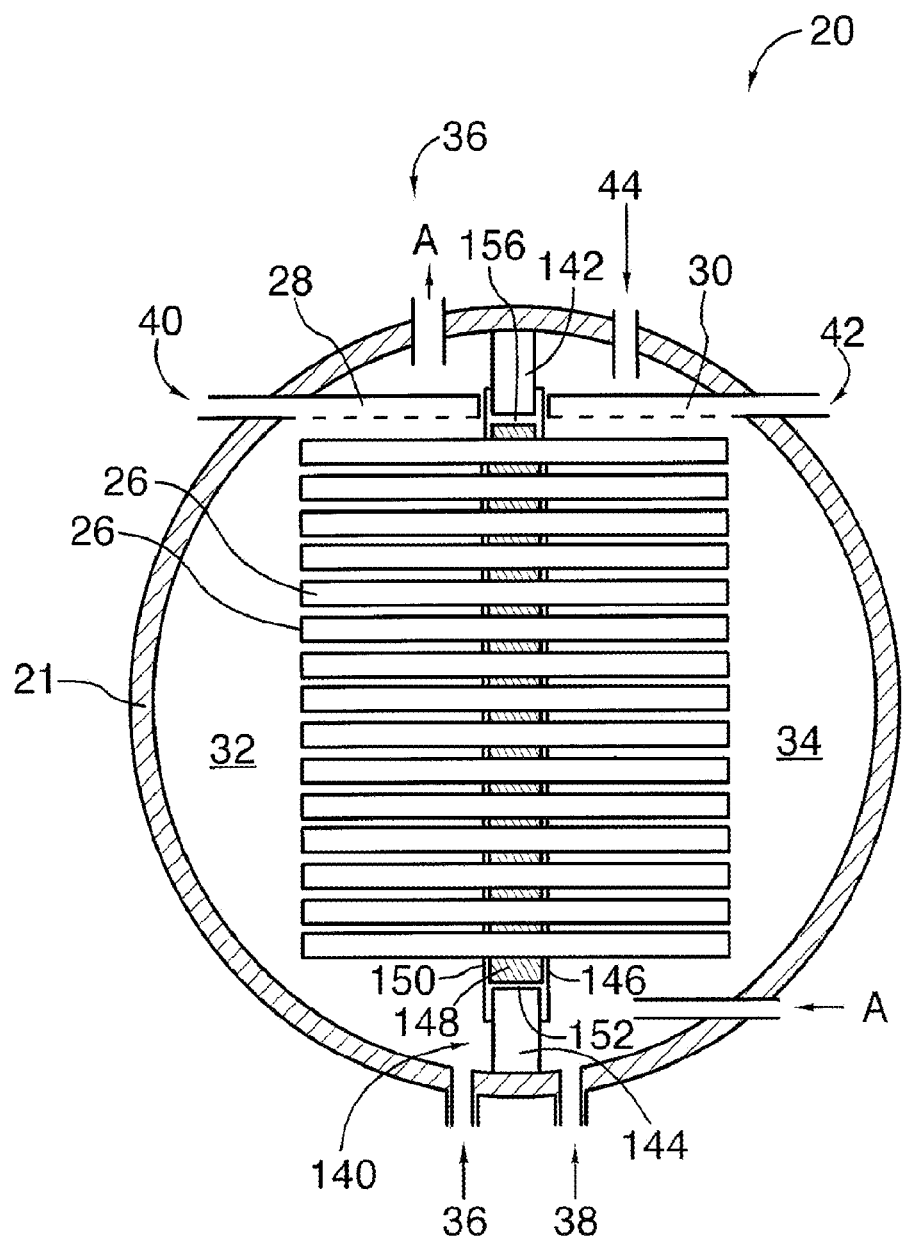
FIG. 9 is a cross-sectional view of a yet further embodiment of the module of FIG. 1.

FIG. 9 shows yet another possible SAM structure, wherein the vessel 21 is defined by a horizontally-orientated cylindrical vessel, the vapor passage 35 [indicated by arrows A] is defined by external piping (not shown) and the first volume 32 and second volume 34 are separated from one another by a vertical bifurcating wall 140. The wall is defined by upper 142 and lower 144 ridges extending interiorly from the tubular wall of the vessel 21. A rubber 148 sheet spans between the ridges 142 and 144 and is sandwiched between steel sheets 146 and 150 which are secured to one another by upper 156 and 152 lower webs. The rubber sheet 148 is perforated with holes to permit the heat pipes 26 to be passed therethrough in substantially hermetically sealed relation; the steel sheets 146,150 have corresponding holes, of larger diameter, to permit free passage of the heat pipes. Without intending to be bound by theory, this arrangement is believed to be advantageous from the standpoint of relatively low construction costs and simplicity in terms of maintenance; for maintenance, the operator would merely be required to remove one end of the vessel, and slide the entire heat pipe assembly out horizontally. Various bearings or rollers (not shown), could also be employed, if desired, to further simply construction. Further, whereas a single bifurcating wall is shown, the vessel could be segmented by two walls, each having heat pipes formed therethrough, to produce a structure having similar functionality to that shown in FIG. 8. In this two wall embodiment (not shown) the heat pipes could be angled, so that drop flow could travel back and forth in the chamber.

Further, whereas specific operating conditions are delineated in the description relating to FIGS. 4 and 5, it will be understood that wide variations are possible.

For example, in the context of an ethanol production facility, wherein the viability of the yeast is to be maintained on a continuous fermentation basis, at least the following ranges are contemplated to have utility:

the broth withdrawn from the fermentation arrangement can have a temperature of about 28-32° C. and an ethanol concentration of about 4-10%;

the remainder broth can have a temperature of about 2-4° C. lower than that of the withdrawn broth and have an ethanol concentration of about 2-4% less than that of the withdrawn broth; and the pressure in the first volume can be about 30-100 Torr.

As well, whereas the structure of FIG. 5 is indicated to be useful for ethanol production, persons of ordinary skill in the art will readily recognize that the structure could be readily modified for handling other separations, notably but not limited to butanol and methanol. Indeed, the general structure of FIG. 5 could be useful for any catabolic reaction having a catabolic inhibitor capable of removal by absorption. Further, whereas the description references continuous production, it should be understood that this is not strictly necessary. In a batch ethanol operation, broth could be withdrawn from the batch tank while the fermentation is underway and passed through a SAM device, to withdraw ethanol. Removing ethanol from the batch would take stress off the yeast and could decrease cycle time and increase yield. As well, whereas in the context of ethanol and a LiBr brine, the thermodynamics are such that ethanol is withdrawn preferentially, i.e. at a higher concentration than the bulk, this is not strictly required for usefulness. In the context of an aqueous system, for example, wherein water and another component are being withdrawn, there could be occasions where it was acceptable that water was withdrawn in preference to the other component, and make-up water was added to balance flows. In this further regard, it should be understood that in this specification and the appended claims, 'liquid mixture' means a liquid with another material mixed together; the other material may be liquid, such as alcohol, but this is not necessarily the case, as evidenced from, inter alia, the apple juice concentrator example.

Further, whereas the secondary absorbers are shown in series with the SAM devices, it will be appreciated that this is not necessary. Secondary absorbers could be deployed in parallel, or omitted altogether in some situations.

Additionally, whereas the distributors are illustrated schematically as perforated pipes, but it will be understood that sprayers or distribution trays, such as used in packed columns, could be used. The particular form of distributor chosen will vary, inter alia, with the geometry of the reactor and is a matter of routine for persons of ordinary skill.

Yet further variations on all the above would be readily appreciated by persons of ordinary skill in the art. Accordingly, the invention should be understood as limited only by the accompanying claims, purposively construed.

The invention claimed is:

1. Process for use with a flow of a liquid mixture that is separable by vaporization into a flow of vapor and a depleted flow of liquid, the process comprising:
   a vaporization step, wherein a portion of said liquid mixture flow is vaporized to produce said flow of vapor and said depleted flow of liquid;
   an absorption step, wherein (i) the flow of vapor is introduced to a flow of brine which is adapted to exothermically absorb one or more components from the vapor and (ii) heat is withdrawn, to produce at least a flow of heat and a flow of brine which is enriched in the one or more components; and
   a heat transfer step, wherein the heat withdrawn in the absorption step is transferred, to drive the vaporization in the vaporization step,
   wherein
   the transfer of heat to drive the vaporization is associated with the phase change of a working fluid from a gaseous state into a liquid state;
   the withdrawal of heat in the absorption step involves the phase change of the working fluid from the liquid state into the gaseous state;
   in the liquid state, the working fluid flows only by one or more of gravity, convection and wicking; and
   in the gaseous state, the working fluid flows only by one or more of diffusion and convection.

2. Apparatus for use with a flow of a liquid mixture that is separable by vaporization into a flow of vapor and a depleted flow of liquid, the apparatus comprising a structure which, in use:
   defines a first volume wherein said liquid mixture is received and separated into said flow of vapor and said depleted flow of liquid;
   defines a first liquid passage by which said depleted flow leaves the first volume;
   defines a vapor passage by which said flow of vapor leaves the first volume;
   defines a second volume to which the vapor passage leads;
   includes heat and mass transfer apparatus disposed at least in part in the second volume, the heat and mass transfer apparatus: (i) receiving a flow of brine adapted to exothermically absorb one or more components from the vapor; (ii) introducing the flow of brine to the vapor; and (iii) withdrawing heat from the second volume, to produce at least a flow of heat and a flow of brine which is enriched in the one or more components;
   defines a second liquid passage by which the flow of brine which is enriched in the one or more components leaves the second volume; and
   includes heat movement apparatus for transferring the flow of heat to the first volume to provide for said separation,
   wherein: the transfer of heat into the first volume is associated with the phase change of a working fluid from a gaseous state into a liquid state; the withdrawal of the heat from the second volume involves the phase change of the working fluid from the liquid state to the gaseous state; in the liquid state, the working fluid flows only by one or more of gravity, convection and wicking; and in the gaseous state, the working fluid flows only by one or more of diffusion and convection.

3. Apparatus according to claim 2, wherein the heat movement apparatus and part of the heat and mass transfer apparatus are defined by one or more heat pipes, each of said one or more heat pipes having a heat receiving part disposed in the second volume and a heat delivering part disposed in the first volume to provide for said heat transfer.

4. Apparatus according to claim 3, wherein the one or more heat pipes are stacked such that that portion of the heat pipes disposed in the first volume operate in use as a packed vaporization column and that portion of the heat pipes disposed in the second volume operate in use as a packed absorption column.

5. Apparatus according to claim 4, wherein, in use, the vapor leaving the first volume is in substantial vapor-liquid equilibrium with the liquid mixture entering the first volume.

6. Apparatus according to claim 5, wherein, in use, the temperature of the depleted flow of liquid leaving the first volume is lower than the temperature of the liquid mixture entering the first volume.

7. Apparatus according to claim 5, wherein, in use, the pressure in the first volume and the temperature of the liquid mixture entering the first volume are such that substantially all of the heat transferred to the first volume results in vaporization of the liquid mixture.

8. Apparatus according to claim 5, wherein:
   the structure further defines a vent leading from the second volume; and
   in use, at least a substantial portion of the vapor is absorbed in the second volume and the balance leaves the second volume via the vent.

9. Apparatus according to claim 8, further comprising desorption apparatus for receiving the flow of brine produced by the heat and mass transfer apparatus and producing:
   the flow of brine adapted to exothermically absorb said one or more components from the vapor; and
   a product stream.

10. Apparatus according to claim 9, further comprising:
    a secondary absorber which, in use: (i) receives the balance of the vapor; and (ii) introduces the balance of the vapor to a secondary flow of brine which is adapted to exothermically absorb the one or more components, to produce a diluted brine.

11. Apparatus according to claim 10, wherein the desorption apparatus further receives the diluted brine and further produces the secondary flow of brine.

12. Apparatus according to claim 10, wherein, in use
    the pressures in the first volume and second volume are reduced in comparison to atmospheric pressure;
    at least the majority of the vapor is absorbed in the second volume; and
    a vacuum pump provides for at least the non-condensables of the vapor to be voided from the apparatus.

13. Apparatus according to claim 4, wherein the first volume is defined by one or more first voids and the second volume is defined by one or more second voids.

14. Apparatus according to claim 13, wherein
    each of the one or more first voids and each of the one or more second voids are defined by a respective vessel; and
    piping defines the vapor passage.

15. Apparatus according to claim 13, wherein each of the one or more first voids and each of the one or more second voids are defined in a vessel.

16. Apparatus according to claim 15, wherein piping exterior to the vessel defines the vapor passage.

17. Apparatus according to claim 16, wherein (i) the vessel is compartmentalized by bulkheads to define the one or more first voids and one or more second voids and (ii) one or more apertures defined in the bulkheads define the vapor passage.

18. A bioproduct production facility comprising:
an arrangement wherein, in use, catabolism of a broth takes place on a continuous basis; and
apparatus according to claim 9, coupled to the arrangement to:
withdraw a flow of the broth on a continuous basis;
remove a catabolic inhibitor from the withdrawn broth to produce an inhibitor-containing flow and a remainder flow; and
return the remainder flow to the arrangement.

19. A facility according to claim 18, wherein the catabolism is fermentation and the inhibitor is alcohol.

20. A facility according to claim 19, wherein the inhibitor-containing flow has a higher concentration of the inhibitor than does the broth.

21. A facility according to claim 20,
wherein, in use, a bleed stream of the broth is withdrawn to avoid toxin buildup; and
the bleed stream is fermented in batches; and
further comprising: apparatus according to claim 4, for receiving the product of a batch fermentation and producing (i) a stream of whole stillage from which ethanol has been substantially removed and (ii) brine enriched in ethanol which is fed to the desorption apparatus and separated.

22. A facility according to claim 21, wherein, in use: the broth withdrawn from the arrangement has a temperature of about 28-32° C. and an ethanol concentration of about 4-10%; the remainder flow has a temperature of about 2-4° C. lower than that of the withdrawn flow, and has an ethanol concentration of about 2-6% less than that of the withdrawn flow; and the pressure in the first volume is about 30-100 Torr.

23. A facility according to claim 22, wherein, in use: the broth withdrawn from the arrangement has a temperature of about 30° C. and an ethanol concentration of about 7%; the remainder flow has a temperature of about 28° C. and an ethanol concentration of about 2%; and the pressure in the first volume is about 30 Torr.

24. Apparatus according to claim 3, wherein the heat pipes are arranged parallel to a common axis and the structure is adapted for pivotal movement about a horizontal axis which is orientated normally to the common axis.

25. A bioproduct production facility comprising:
an arrangement wherein, in use, catabolism of a broth takes place on a batch basis; and
apparatus according to claim 3, coupled to the arrangement to:
withdraw a flow of the broth;
remove a catabolic inhibitor from the withdrawn broth to produce an inhibitor-containing flow and a remainder flow; and
return the remainder flow to the arrangement.

* * * * *